United States Patent
Watanabe et al.

(10) Patent No.: US 10,554,082 B2
(45) Date of Patent: Feb. 4, 2020

(54) AXIAL GAP TYPE ROTATING MACHINE

(71) Applicant: SHIN-ETSU CHEMICAL CO., LTD., Tokyo (JP)

(72) Inventors: Naoki Watanabe, Echizen (JP); Yuhito Doi, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 99 days.

(21) Appl. No.: 15/093,073

(22) Filed: Apr. 7, 2016

(65) Prior Publication Data

US 2016/0308411 A1 Oct. 20, 2016

(30) Foreign Application Priority Data

Apr. 17, 2015 (JP) ................................ 2015-085200

(51) Int. Cl.
*H02K 1/27* (2006.01)
*H02K 21/24* (2006.01)
(Continued)

(52) U.S. Cl.
CPC ............. *H02K 1/2793* (2013.01); *H02K 1/02* (2013.01); *H02K 1/14* (2013.01); *H02K 16/02* (2013.01);
(Continued)

(58) Field of Classification Search
CPC ............ H02K 1/02; H02K 1/06; H02K 1/182; H02K 1/2793; H02K 16/04; H02K 17/16;
(Continued)

(56) References Cited

U.S. PATENT DOCUMENTS

| | | | | |
|---|---|---|---|---|
| 4,187,441 A | * | 2/1980 | Oney | ..................... H02K 16/00 |
| | | | | 310/112 |
| 6,531,799 B1 | * | 3/2003 | Miller | .................. H02K 21/046 |
| | | | | 310/112 |

(Continued)

FOREIGN PATENT DOCUMENTS

| CN | 104283386 A | 1/2015 |
|---|---|---|
| JP | 2008-295284 A | 12/2008 |

(Continued)

OTHER PUBLICATIONS

Extended European Search Report, EP Application No. 16164582.5, dated Aug. 29, 2016, 9 pages.

(Continued)

*Primary Examiner* — Jermele M Hollington
*Assistant Examiner* — Rashad H Johnson
(74) *Attorney, Agent, or Firm* — Myers Bigel, P.A.

(57) ABSTRACT

An axial gap type rotating machine that provides high productivity at low cost and high performance is presented. Specifically, an axial gap type rotating machine comprising: in a housing, a rotating shaft; at least two rotors comprising at least two rotor cores being rotatable together with the rotating shaft as a central axis and being disposed perpendicular to the rotating shaft with an interval along the rotating shaft, and at least two permanent magnets and at least two soft magnetic members arranged in a predetermined configuration; and at least one stator comprising a soft magnetic or nonmagnetic stator core and a coil wound on the stator core, wherein the at least one stator is fixed to the housing and disposed in a gap between the at least two rotors.

3 Claims, 12 Drawing Sheets

(51) Int. Cl.
  *H02K 1/02*    (2006.01)
  *H02K 16/02*   (2006.01)
  *H02K 1/14*    (2006.01)
  *H02K 21/16*   (2006.01)
  *H02K 1/06*    (2006.01)
  *H02K 19/10*   (2006.01)
  *H02K 17/16*   (2006.01)
  *H02K 1/18*    (2006.01)
  *H02K 5/173*   (2006.01)

(52) U.S. Cl.
  CPC .......... *H02K 21/24* (2013.01); *H02K 1/06* (2013.01); *H02K 1/182* (2013.01); *H02K 5/1732* (2013.01); *H02K 17/16* (2013.01); *H02K 19/103* (2013.01); *H02K 21/16* (2013.01)

(58) Field of Classification Search
  CPC ...... H02K 19/103; H02K 21/16; H02K 21/24; H02K 2204/03
  USPC ....... 310/112, 114, 126, 156.32–156.64, 268
  See application file for complete search history.

(56) References Cited

U.S. PATENT DOCUMENTS

| | | | | |
|---|---|---|---|---|
| 6,794,783 | B2* | 9/2004 | Tu | H02K 3/04 310/156.32 |
| 7,514,833 | B2* | 4/2009 | Hsu | H02K 21/24 310/156.34 |
| 8,242,653 | B2* | 8/2012 | Ichiyama | H02K 16/00 310/156.44 |
| 2006/0284507 | A1 | 12/2006 | Murakami | |
| 2007/0024144 | A1* | 2/2007 | Obidniak | H02K 21/24 310/156.36 |
| 2008/0265816 | A1 | 10/2008 | Takeuchi et al. | |
| 2009/0152956 | A1 | 6/2009 | Yang | |
| 2010/0072850 | A1 | 3/2010 | Miyata et al. | |
| 2010/0277025 | A1 | 11/2010 | Doi et al. | |
| 2010/0289350 | A1* | 11/2010 | Watanabe | H02K 3/522 310/63 |
| 2011/0080065 | A1* | 4/2011 | Watanabe | H02K 1/2793 310/156.32 |
| 2011/0101902 | A1 | 5/2011 | Takeuchi et al. | |
| 2012/0062162 | A1 | 3/2012 | Takeuchi et al. | |
| 2012/0233848 | A1 | 9/2012 | Doi et al. | |
| 2012/0291263 | A1 | 11/2012 | Doi et al. | |
| 2013/0038181 | A1 | 2/2013 | Takeuchi et al. | |
| 2014/0103773 | A1* | 4/2014 | Yang | H02K 21/24 310/156.48 |
| 2014/0319935 | A1* | 10/2014 | Lin | H02K 1/06 310/12.24 |
| 2015/0015108 | A1* | 1/2015 | Hashiba | H02K 1/2793 310/156.37 |
| 2015/0061428 | A1* | 3/2015 | Jimbo | H02K 21/24 310/62 |

FOREIGN PATENT DOCUMENTS

| | | |
|---|---|---|
| JP | 2009-033946 A | 2/2009 |
| JP | 2010-190283 A | 9/2010 |
| JP | 2010-200518 A | 9/2010 |
| JP | 2012-244874 A | 12/2012 |
| JP | 2015-19546 A | 1/2015 |

OTHER PUBLICATIONS

Communication pursuant to Article 94(3) EPC, EP Application No. 16164582.5, dated Feb. 16, 2018, 6 pp.
Office Action with English-language translation, JP Application No. 2016-078060, dated Jan. 25, 2019, 9 pp.
The First Office Action with English language translation, Chinese Patent Application No. 201610232344.4, dated Dec. 28, 2018.
The Second Office Action with English-language translation, CN Application No. 201610232344.4, dated Aug. 27, 2019, 17 pp.
Final Office Action with English language translation, JP Application No. 2016-078060, dated Sep. 10, 2019, 11 pp.

* cited by examiner

1

AXIAL GAP TYPE ROTATING MACHINE

RELATED APPLICATION

This application claims priority from Japanese Patent Application No. 2015-085200, filed Apr. 17, 2015, the disclosure of which is incorporated by reference herein in its entirety.

BACKGROUND

The present invention relates to a synchronous type permanent magnet rotating machine that can be used as a motor, a generator, or the like and, in particular, relates to an axial gap type rotating machine in which rotors and a stator face each other in a direction along the rotating shaft.

Permanent magnet rotating machines are classified into a radial gap type and an axial gap type based on their structures. In the radial gap type, a plurality of permanent magnets having radial magnetization directions are arranged in a circumferential direction of a cylindrical rotor and a stator is disposed along the outer peripheral side or the inner peripheral side of the rotor so as to face the permanent magnets. Generally, the stator has a structure in which coils are wound on an iron core having a plurality of teeth in its surface facing the rotor. By the use of the iron core, the magnetic flux from the poles of the rotor can efficiently cross the coils so as to produce a large torque in the case of a motor and a large voltage in the case of a generator.

On the other hand, in the axial gap type, disc-shaped rotors are mounted on a rotating shaft and a stator is disposed to face the rotors in a direction along the rotating shaft and, as in the radial gap type, a plurality of permanent magnets are attached to the rotors and a plurality of coils are attached to the stator so as to face the permanent magnets (JP 2009-33946 A, JP 2010-200518 A). Differently from the radial gap type, the axial gap type is configured such that the stator is sandwiched between the two rotors, and therefore, the area ratio of the permanent magnets occupied in the entire rotating machine can be made large so that, for example, it is possible to improve the characteristics such as the torque density of the rotating machine. In view of this advantage, the axial gap type rotating machine is applied, for example, to a driving motor of a hybrid vehicle or an electric car, for which the high output performance is required, or to a compressor of an air conditioner, a refrigerator, a freezer, a showcase, or the like.

Under the current circumstances, however, the radial gap type is more common. One of reasons for this includes that the axial gap type is complicated in structure and difficult in assembly.

As shown in FIG. 14, a general axial gap type rotating machine 100 comprises, in a housing 109, a rotating shaft 101 rotatably supported by the housing 109 via bearings 110, two rotors 102*a* and 102*b* each having permanent magnets 104 and a rotor core 103, and a stator 108 having coils 106 and a stator core 107, and in some cases, has a structure in which the two rotors 102*a* and 102*b* are mounted on the rotating shaft 101 with a spacer 111 interposed therebetween and the stator 108 is disposed in a gap between the two rotors 102*a* and 102*b*.

In the case of a motor, by supplying three-phase sinusoidal currents to the coils fixed into the stator core, the rotors are rotated by a reluctance torque in addition to a magnetic torque due to attraction and repulsion forces between the coils and the permanent magnets. In the case of a generator, the induced voltage is generated by forcibly rotating the rotors from the outside so as to allow magnetic flux generated by the permanent magnets to cross the coils.

As shown in FIG. 15, the rotors 102*a* and 102*b* used in the general axial gap type rotating machine 100 are each configured such that the permanent magnets 104 are arranged on the rotor core 103 at regular intervals along the circumferential direction and that the adjacent permanent magnets 104 have opposite polarities in a direction along the rotating shaft. The two rotors 102*a* and 102*b* having such configuration are disposed so that the permanent magnets 104 of the one rotor 102*a* and the permanent magnets 104 of the other rotor 102*b* face each other in such a way as to have opposite polarities, thereby generating magnetic forces 112. The mutual distance (interval) between the permanent magnets 104 arranged on each rotor core 103 should be narrow and the magnets having opposite polarities should be adjacent to each other. In order to simplify the assembly process, post-magnetization is attempted in which unmagnetized magnets are first bonded to the rotor core 103 and then are magnetized.

SUMMARY

However, there arises a problem that magnetization is difficult owing to the narrow mutual distance between the permanent magnets arranged on the rotor core. In order to solve this problem, it may be considered to increase the distance between the magnets. This causes, however, another problem that the output efficiency per unit volume decreases. Therefore, in the manufacture under the current circumstances, although the production efficiency of the assembly process is poor, pre-magnetization should be employed in which magnetized magnets will be bonded to the rotor core.

Further, since a rare-earth magnet used as the permanent magnet is very expensive, it costs high. Consequently, it is of urgent necessity to reduce the amount of use thereof without degrading the characteristics of the rotating machine.

It is an object of the present invention to provide an axial gap type rotating machine that enables post-magnetization with high productivity at low cost and high performance.

As a result of intensive studies to solve the above-mentioned problems, the present inventors have found an axial gap type rotating machine that ensures high productivity and that has high performance even if the amount of permanent magnets is significantly reduced.

That is, according to the present invention, it is possible to provide an axial gap type rotating machine comprising:
a housing;
and in the housing,
a rotating shaft;
at least two rotors comprising:
at least two rotor cores being rotatable together with the rotating shaft as a central axis and being disposed perpendicular to the rotating shaft with an interval along the rotating shaft; and
at least two permanent magnets and at least two soft magnetic members arranged in a first configuration in which the at least two permanent magnets and the at least two soft magnetic members are alternately arranged in a circumferential direction on at least one of facing two surfaces of the at least two rotor cores and the at least two permanent magnets arranged on the at least one surface have the same polarities in a direction along the rotating shaft; or in a second configuration in which the at least two permanent magnets are arranged in a circumferential direction on one of facing two surfaces of the at least two rotor cores, the at least two soft magnetic members are arranged, on the other of the facing two surfaces, at positions opposing to the at least two permanent magnets, and the at least two permanent magnets have opposite polarities in a direction along the rotating shaft in such a alternate manner in the circumferential direction; and at least one stator comprising:

a soft magnetic or nonmagnetic stator core; and a coil wound on the stator core, wherein the at least one stator is fixed to the housing and disposed in a gap between the at least two rotors.

According to the present invention, it is possible to obtain an axial gap type rotating machine that ensures high productivity and that has high performance even if the amount of permanent magnets is significantly reduced. Such an axial gap type rotating machine has an extremely high industrial utility value.

DETAILED DESCRIPTION

Figure 1:
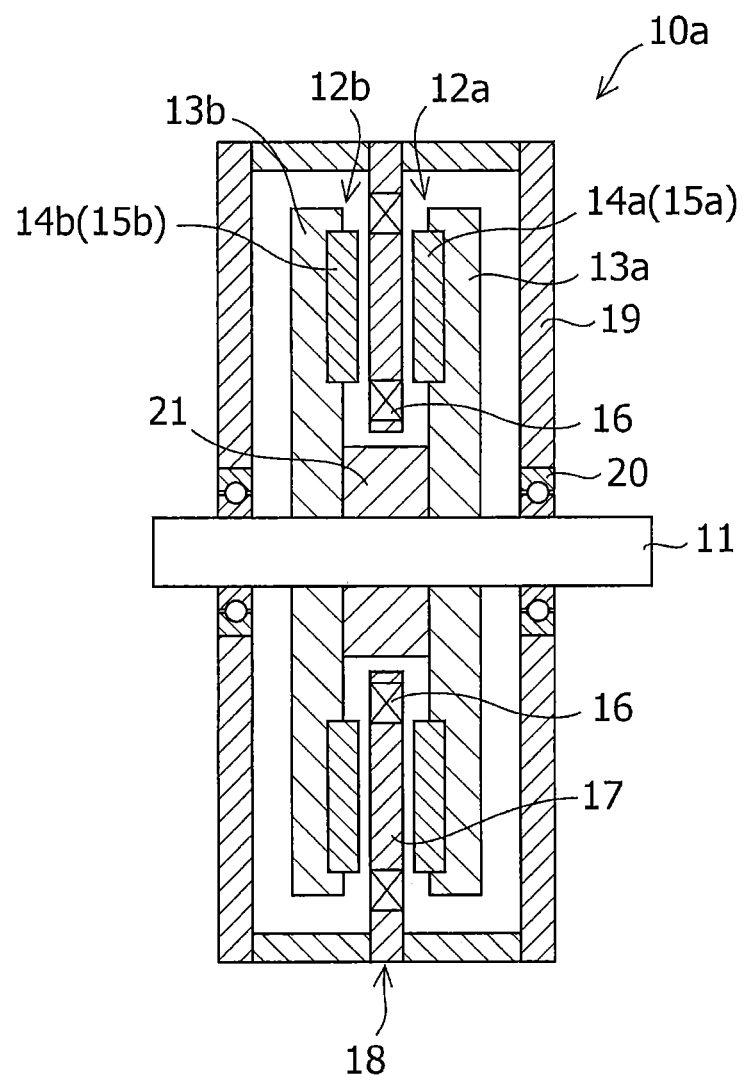
FIG. 1 is a schematic sectional view in an embodiment showing the whole of an axial gap type rotating machine of the present invention.

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

According to the present invention, an axial gap type rotating machine comprises a housing and further comprises, in the housing, a rotating shaft, at least two rotors comprising at least two rotor cores and at least two permanent magnets and at least two soft magnetic members arranged in a predetermined configuration on at least one of facing two surfaces of the at least two rotor cores, and at least one stator fixed to the housing and disposed in a gap formed between the at least two rotors.

The housing is not particularly limited as long as it has a shape that can comprise therein the rotating shaft, the at least two rotors, and the at least one stator. The rotating shaft is rotatably supported by the housing via bearings. With this structure, a high output can be obtained by enlarging magnetic pole surfaces even without using an iron core in the stator.

The material of the rotor core is preferably a magnetic material and there is included, for example, a low-carbon steel such as S15C or S45C, a cold-rolled steel sheet (SPCC), or an electromagnetic steel sheet and the like. By making the rotor cores of the magnetic material, it is possible to strengthen the magnetic field between the rotors.

The rotor comprises the rotor core and the at least two permanent magnets and/or the at least two soft magnetic members arranged on the rotor core. The permanent magnets and/or the soft magnetic members may be arranged on one or both surfaces of the rotor core and are arranged at least one of the surfaces. The permanent magnets and/or the soft magnetic members may be attached to the rotor core, for example, using an adhesive agent. As the adhesive agent, for example, an epoxy adhesive agent or, an acrylic adhesive agent can be used. Alternatively, an elastic heat-resistant adhesive agent can be used in order to withstand the heat cycle. The adhesive agent is applied to the entire surfaces to be in contact with the rotor core, of the permanent magnets or the soft magnetic members, and then the permanent magnets or the soft magnetic members are attached to the rotor core. When arranged on both surfaces of the rotor core, the permanent magnets or the soft magnetic members may be attached to each of the surfaces using the adhesive agent. Alternatively, portions, through which the permanent magnets or the soft magnetic members are to be arranged, of the rotor core may be penetrated in advance in a direction of the rotating shaft and then the permanent magnets or the soft magnetic members may be fitted into the penetrated portions. Upper surfaces of the permanent magnets or the soft magnetic members arranged on the rotor core are preferably parallel to an upper surface of the rotor core. Further, while the upper surfaces of the permanent magnets or the soft magnetic members may be higher or lower position than the upper surface of the rotor core, the upper surfaces of the permanent magnets or the soft magnetic members preferably have the same height or depth difference with respect to the level of the upper surface of the rotor core.

While the material of the permanent magnet is not particularly limited and may be a conventionally known material, it is preferable to use a high-performance rare-earth magnet containing a rare-earth element. The soft magnetic member is magnetized when an external magnetic field is applied thereto, whereas the magnetization disappears when the external magnetic field is removed. The material of the soft magnetic member is not particularly limited. The soft magnetic member comprises preferably a silicon steel sheet, a bulk material such as iron (e.g. SS400), a dust core, or the like. The shapes of the permanent magnet and the soft magnetic member are not particularly limited and may be rectangular, fan-shaped, or the like. The permanent magnet and the soft magnetic member have preferably the same shape and size.

The number of the permanent magnets and the number of the soft magnetic members are not particularly limited. In order to make the number of magnetic poles having one polarity equal to the number of magnetic poles having the opposite polarity on a surface of the rotor, the number of the permanent magnets and the number of the soft magnetic members are preferably the same and are each preferably at least two. Further, the numbers of magnetic poles formed on facing two surfaces of the two rotors are configured such that the number of magnetic poles formed on one of the facing two surfaces of the rotors is equal to the number of magnetic poles of the other of the facing two surfaces of the rotors. In the later-described first embodiment, for example, when eight permanent magnets and eight soft magnetic members are alternately arranged on one of the facing two surfaces of the rotor cores, eight permanent magnets and eight soft magnetic members are alternately arranged also on the other of the facing two surfaces of the rotor cores. The distances (intervals) between the adjacent permanent magnets and soft magnetic members are preferably all equal to each other. In the first embodiment, the number of the permanent magnets and the number of the soft magnetic members on each of the facing two surfaces of the rotors are each preferably 2 to 16, more preferably 2 to 12, particularly preferably 2 to 8. In the later-described second embodiment, for example, when 16 permanent magnets are arranged on one of the facing two surface of the rotor cores in such a way that the polarities of the magnetic poles alternate with each other, 16 soft magnetic members are arranged on the other of the facing two surfaces of the rotor cores. The distances (intervals) between the adjacent permanent magnets and between the adjacent soft magnetic members are preferably all equal to each other. In the second embodiment, the number of the permanent magnets on the one of the facing two surfaces of the rotor cores and the number of the soft magnetic members on the other of the facing two surfaces are preferably the same and are each preferably 2 to 32, more preferably 2 to 24, particularly preferably 2 to 16.

The order of arranging the permanent magnets and the soft magnetic members on the rotor core is not particularly limited. For example, when the permanent magnets and the soft magnetic members are used on a rotor core, the soft magnetic members and the magnetized permanent magnets having the same polarity may be alternately arranged on the rotor core at the same time. In the alternative, the unmagnetized permanent magnets may be arranged with an interval therebetween on the rotor core and magnetized and then the soft magnetic members may be arranged between the permanent magnets. In the further alternative, the soft magnetic members and unmagnetized permanent magnets may be alternately arranged on a rotor core and then magnetized. On the other hand, for example, when only the permanent magnets are used on a rotor core, the magnetized permanent magnets may be arranged on the rotor core so that the polarities of the magnetic poles alternate with each other. In the alternative, unmagnetized permanent magnets may be arranged with an interval therebetween on the rotor core and magnetized, and then unmagnetized permanent magnets to be magnetized to the opposite polarity or magnetized permanent magnets having the opposite polarity may be arranged between the magnetized permanent magnets. When the unmagnetized permanent magnets are arranged, magnetization thereof may be carried out while covering the magnetized permanent magnets already arranged on the rotor core to prevent a change in polarity. The soft magnetic member is not affected by a means for magnetizing the permanent magnet, but is affected when facing or adjoining the magnetized permanent magnet to form a quasi magnetic pole (quasi pole).

A rotating machine according to the present invention comprises at least two rotors and these rotors can rotate together with a rotating shaft as a central axis and are disposed perpendicular to the rotating shaft so as to face each other with an interval along the rotating shaft. In some cases, a spacer may be interposed between the at least two rotors mounted on the rotating shaft. The number of the rotors is not particularly limited, and is preferably at least two in order to generate a magnetic force. The number of the rotors is more preferably 2 to 4, further preferably 2 to 3.

In the at least two rotors disposed in the rotating machine, at least two permanent magnets and at least two soft magnetic members are arranged in a predetermined configuration on one or both of the facing two surfaces of at least two rotor cores. The predetermined configuration includes a first configuration and a second configuration. In the first configuration, the at least two permanent magnets and the at least two soft magnetic members are alternately arranged in a circumferential direction on at least one of the facing two surfaces of the at least two rotor cores and the permanent magnets arranged on the one surface have the same polarity in a direction along the rotating shaft. In the second configuration, the at least two permanent magnets are arranged in a circumferential direction on one of the facing two surfaces of the at least two rotor cores, the at least two soft magnetic members are arranged, on the other of the facing two surfaces, at positions opposing to the at least two permanent magnets, and the permanent magnets have opposite polarities in a direction along the rotating shaft in such a alternate manner in the circumferential direction.

In the first configuration, the at least two permanent magnets and the at least two soft magnetic members may be arranged on each of the facing two surfaces of the at least two rotor cores, and the permanent magnets and the soft magnetic members may be alternately arranged in the circumferential direction in each surface, thereby forming a consequent pole type structure. With the consequent pole type structure of the rotor, the permanent magnets of opposite polarities do not adjoin each other and all the permanent magnets arranged on the one rotor core can be magnetized in the same polarity, and therefore, post-magnetization is enabled so that the assembly work is easy compared to the conventional configuration, leading to an improvement in production efficiency. The soft magnetic member disposed between the two permanent magnets forms a quasi magnetic pole (quasi pole) of a polarity opposite to that of the permanent magnets. Therefore, the consequent pole type structure makes it possible to reduce the amount of the permanent magnets by half in comparison with the conventional configuration.

In one embodiment in which the two rotors each having the consequent pole type structure are used and their surfaces provided with the permanent magnets are disposed to face each other, the permanent magnets on one rotor core may face the permanent magnets on the other rotor core, the soft magnetic members on the one rotor core may face the soft magnetic members on the other rotor core, and the polarity of the permanent magnets on one rotor core may differ from the polarity of the permanent magnets on the other rotor core. In another embodiment, the permanent magnets on one rotor core may face the soft magnetic members on the other rotor core, the soft magnetic members on one rotor core may face the permanent magnets on the other rotor core, and the polarity of the permanent magnets on one rotor core may be the same as the polarity of the permanent magnets on the other rotor core. With this configuration, it is possible to generate a magnetic force between the permanent magnets or the soft magnetic members of one of the facing two rotor cores and the permanent magnets or the soft magnetic members on the other of the facing two rotor cores.

In the rotating machine according to the present invention, at least one stator is disposed in a gap formed by disposing the at least two rotors facing each other. When each of at least two rotors comprises at least two permanent magnets on both surfaces of a rotor core, a stator may also be disposed in a gap between each rotor and a housing. The stator is isolated from rotation of the rotating shaft and is fixed, for example, to a housing as a storage case. The number of the stators is not particularly limited, but preferably matches the number of gaps formed between the rotors disposed in such a way that their surfaces provided with the permanent magnets face each other. At least one stator is provided.

The stator comprises a stator core and a coil wound on the stator core. The stator core may be configured such that, for example, a plurality of teeth (pole teeth) around which coils are respectively wound are provided in the circumferential direction of the rotor. The coil may comprise, for example, around wire or a rectangular wire. The material of the stator core may be a silicon steel sheet, a bulk material such as SS400, a soft magnetic material such as a dust core, or a nonmagnetic material. The nonmagnetic material is not particularly limited and there is included, for example, aluminum; an austenitic stainless steel such as SUS301, SUS302, SUS303, SUS304, or SUS316; or a resin such as Bakelite, MC nylon, or polyacetal.

Hereinbelow, the present invention will be described in further detail with reference to the drawings. In the following description, a symbol with a suffix may be collectively referred to as same symbol with no suffix, for example, 12*a* and 12*b* are collectively referred to as 12.

As shown in FIG. 1, an axial gap type rotating machine 10*a* in an embodiment of the present invention comprises a housing 19 and further comprises, in the housing 19, a rotating shaft 11, two rotors 12*a* and 12*b*, and a stator 18. The rotating shaft 11 is rotatably supported by the housing 19 via bearings 20. The two rotors 12*a* and 12*b* comprise two rotor cores 13*a* and 13*b*, and at least two permanent magnets 14 and at least two soft magnetic members 15 arranged in a predetermined configuration on each of facing two surfaces on the two rotor cores 13*a* and 13*b*. At positions opposing to the permanent magnets 14*a* arranged on the rotor core 13*a* of one rotor 12*a*, the permanent magnets 14*b* is provided on the rotor core 13*b* of the other rotor 12*b*. Likewise, at positions opposing to the soft magnetic members 15*a* arranged on the rotor core 13*a* of one rotor 12*a*, the soft magnetic members 15*b* is provided on the rotor core 13*b* of the other rotor 12*b*. The stator 18 comprises a soft magnetic or nonmagnetic stator core 17 and coils 16 wound on the stator core 17 and is fixed to the housing 19 and disposed in a gap formed between the two rotors 12*a* and 12*b*.

Figure 2:
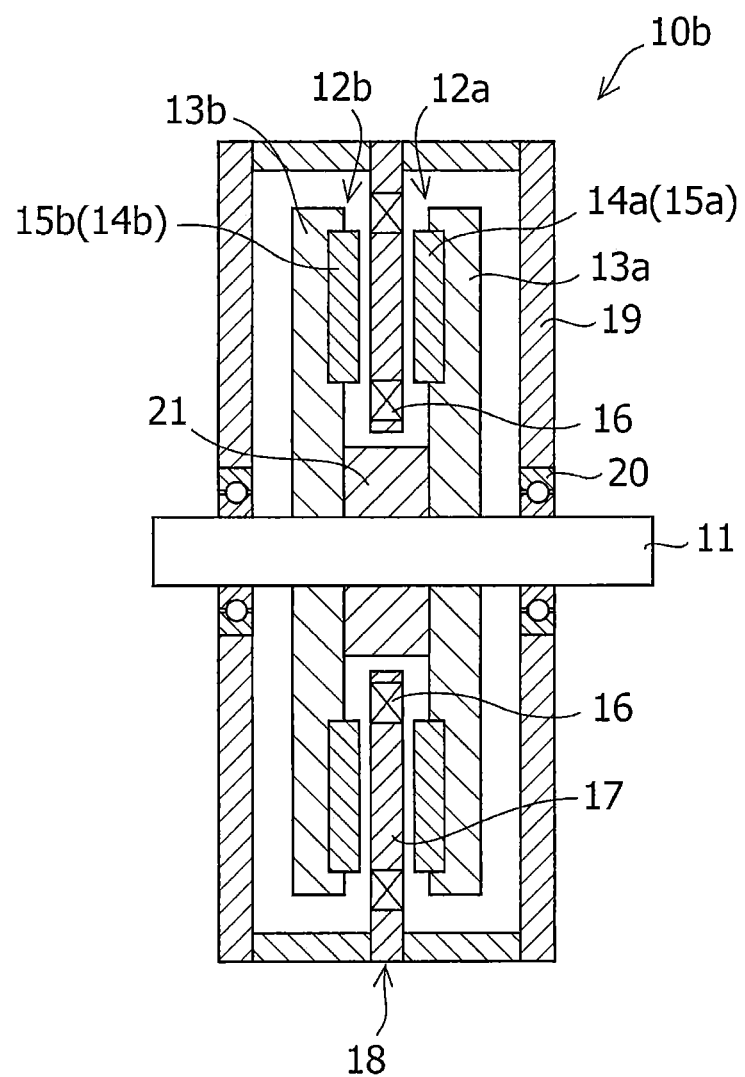
FIG. 2 is a schematic sectional view in another embodiment showing the whole of an axial gap type rotating machine of the present invention.

As shown in FIG. 2, similarly to FIG. 1, an axial gap type rotating machine 10*b* in another embodiment of the present invention comprises a housing 19 and further comprises, in the housing 19, a rotating shaft 11, two rotors 12*a* and 12*b*, and a stator 18. In FIG. 2, differently from FIG. 1, the two rotors 12*a* and 12*b* are configured such that, at positions opposing to permanent magnets 14*a* arranged on a rotor core 13*a* of one rotor 12*a*, soft magnetic members 15*b* is provided on a rotor core 13*b* of the other rotor 12*b*. Likewise, at positions opposing to soft magnetic members 15*a* arranged on the rotor core 13*a* of one rotor 12*a*, permanent magnets 14*b* is provided on the rotor core 13*b* of the other rotor 12*b*.

Figure 3:
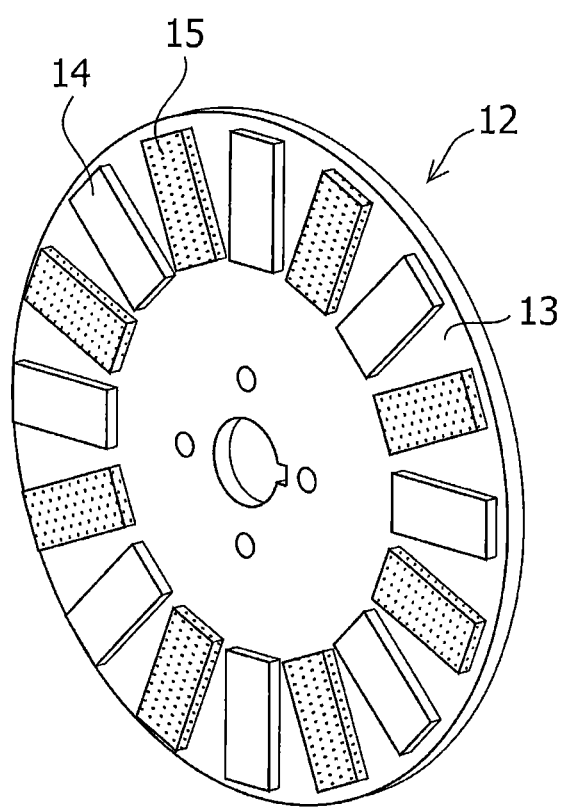
FIG. 3 is a schematic perspective view of a rotor that can be employed in the rotating machine of FIG. 1 or 2.

As shown in FIG. 3, as one example of the rotor 12, eight permanent magnets 14 and eight soft magnetic members 15 are alternately arranged in the circumferential direction on one surface of the rotor core 13, thereby forming a consequent pole type structure. All the permanent magnets 14 on the rotor core 13 are magnetized in the same direction so that the soft magnetic members 15 are formed into quasi poles.

The rotating machine 10 comprises the two rotors 12*a* and 12*b*. The rotors 12*a* and 12*b* can rotate together with the rotating shaft 11 as a central axis and are disposed perpendicular to the rotating shaft 11 so as to face each other with an interval along the rotating shaft 11 and with an optional spacer 21 interposed therebetween.

Figure 4:
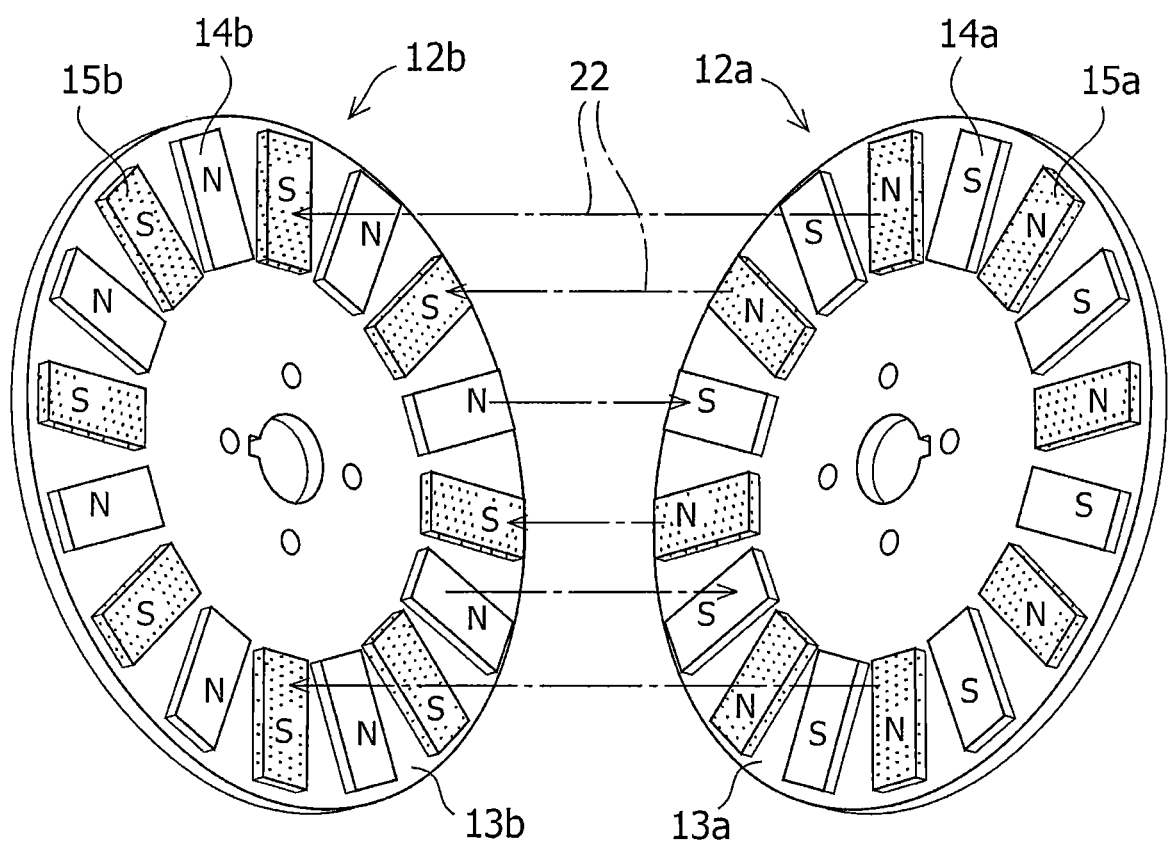
FIG. 4 is a perspective view showing an example of two rotors disposed in the rotating machine of FIG. 1, wherein the two rotors are developed therebetween on a plane perpendicular to a rotating shaft.

In an embodiment of the arrangement of the two rotors 12*a* and 12*b* disposed in the rotating machine of FIG. 1, for example, when a rotor comprises the same arrangement of permanent magnets and soft magnetic members as in FIG. 3 the permanent magnets 14 on the rotor cores 13*a* and 13*b* of the two rotors 12*a* and 12*b* are disposed to face each other, as shown in FIG. 4. In this arrangement, when the poles of all the permanent magnets 14*a* disposed on the rotor core 13*a* of one rotor 12*a* are the S-poles and the poles of all the permanent magnets 14*b* disposed on the rotor core 13*b* of the other rotor 12*b* are the N-poles, the quasi poles of all the soft magnetic members 15*a* of the rotor 12*a* become the N-poles and the quasi poles of all the soft magnetic members 15*b* of the rotor 12b become the S-poles. Since the rotors 12a and 12b have the consequent pole type structure, when the permanent magnets 14a of the rotor 12a and the permanent magnets 14b of the rotor 12b are disposed to face each other, the soft magnetic members 15a of the rotor 12a and the soft magnetic members 15b of the rotor 12b face each other. With this configuration, it is possible to generate magnetic forces 22 between the permanent magnets 14a of the rotor 12a and the permanent magnets 14b of the rotor 12b and between the soft magnetic members 15a of the rotor 12a and the soft magnetic members 15b of the rotor 12b.

Figure 5:
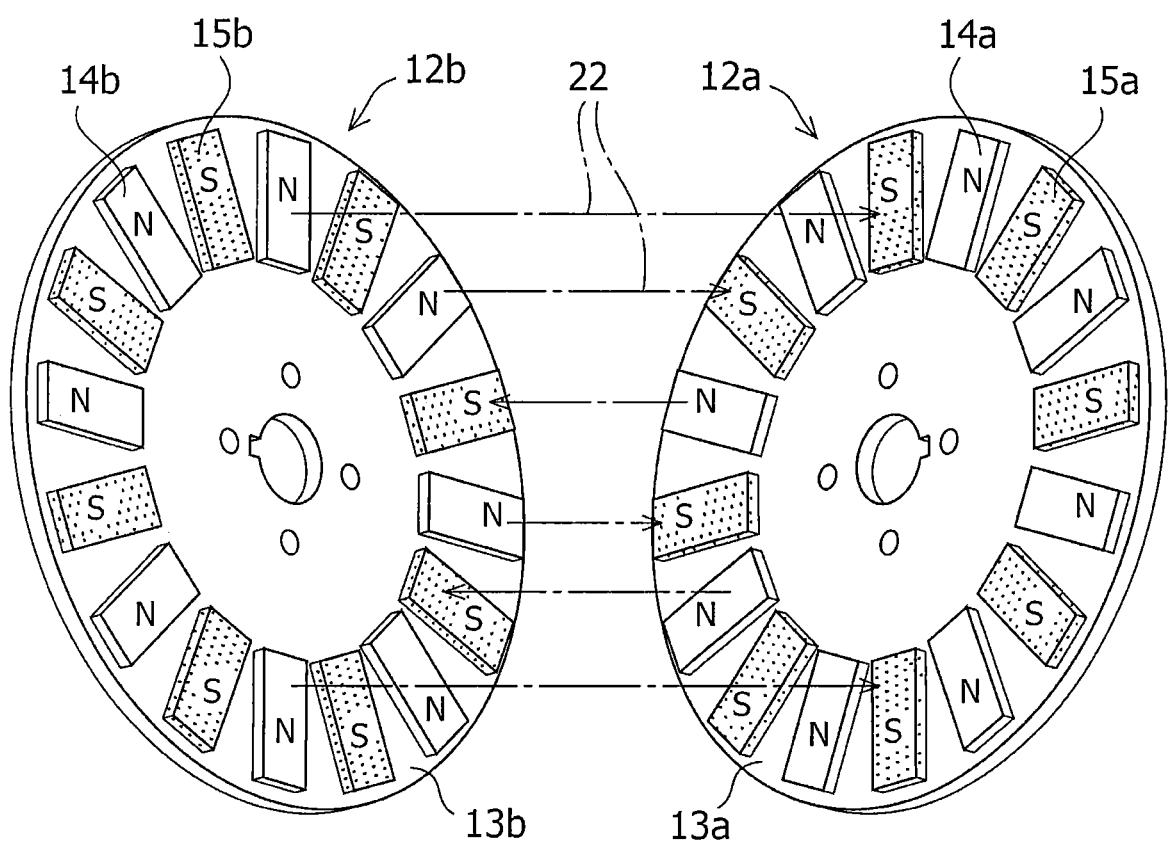
FIG. 5 is a perspective view showing an example of two rotors disposed in the rotating machine of FIG. 2, wherein the two rotors are developed therebetween on a plane perpendicular to a rotating shaft.

In an embodiment of the arrangement of the two rotors 12a and 12b disposed in the rotating machine of FIG. 2, for example, when a rotor comprises the same arrangement of permanent magnets and soft magnetic members as in FIG. 3, if the poles of all the permanent magnets 14a disposed on the rotor core 13a of one rotor 12a and the poles of all the permanent magnets 14b disposed on the rotor core 13b of the other rotor 12b are the N-poles, the quasi poles of all the soft magnetic members 15a of the rotor 12a and the quasi poles of all the soft magnetic members 15b of the rotor 12b become the S-poles as shown in FIG. 5. Since the rotors 12a and 12b have the consequent pole type structure, when the permanent magnets 14a of the rotor 12a and the soft magnetic members 15b of the rotor 12b are disposed to face each other, the soft magnetic members 15a of the rotor 12a and the permanent magnets 14b of the rotor 12b face each other. With this configuration, it is possible to generate magnetic forces 22 between the permanent magnets 14a of the rotor 12a and the soft magnetic members 15b of the rotor 12b and between the soft magnetic members 15a of the rotor 12a and the permanent magnets 14b of the rotor 12b.

Figure 6:
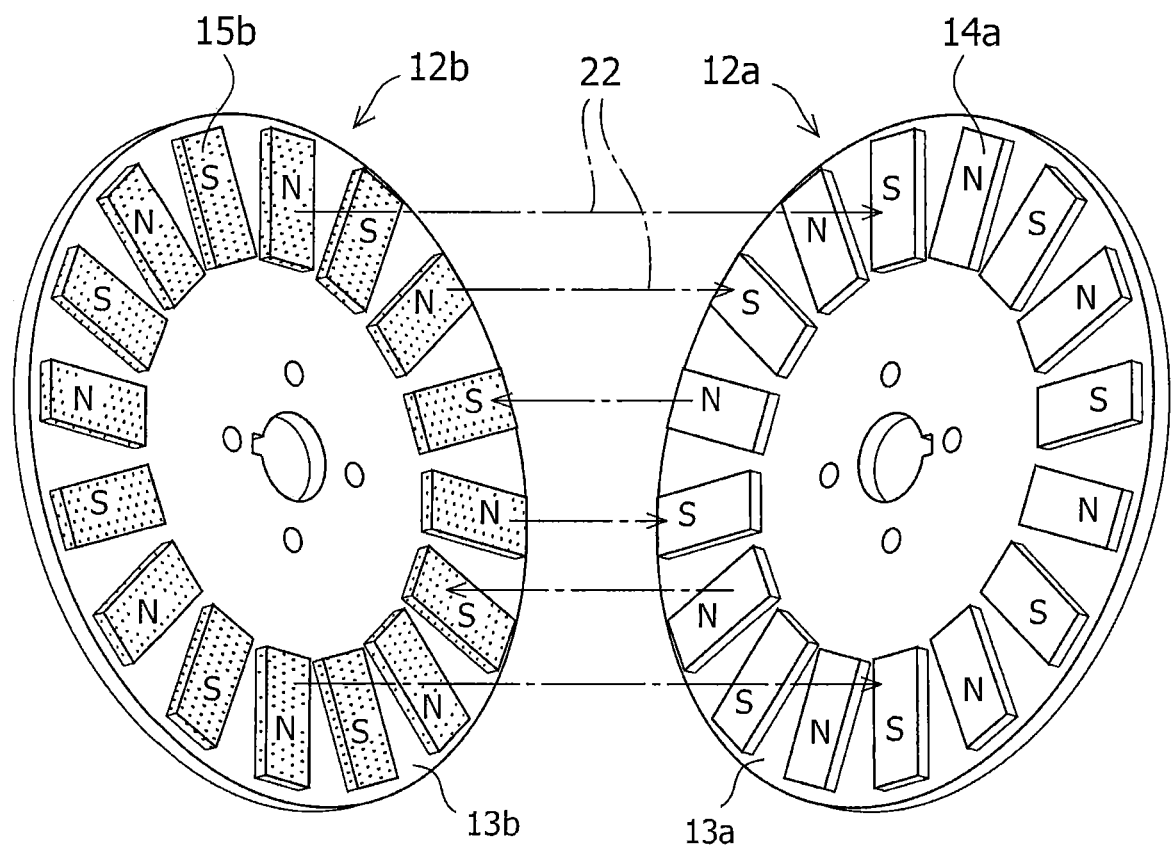
FIG. 6 is a perspective view showing another example of two rotors disposed in the rotating machine of FIG. 2, wherein the two rotors are developed therebetween on a plane perpendicular to a rotating shaft.

In another embodiment of the arrangement of the two rotors 12a and 12b disposed in the rotating machine of FIG. 2, there is a second configuration. For example, as shown in FIG. 6, in the case where permanent magnets 14a are arranged on a rotor core 13a of the one rotor 12a so that the polarities of the poles alternate with each other in the circumferential direction, where the same number of soft magnetic members 15b as the permanent magnets 14a are arranged on a rotor core 13b of the other rotor 12b, and where a surface provided with the permanent magnets 14a of the rotor 12a and a surface provided with the soft magnetic members 15b of the rotor 12b face each other, the soft magnetic members 15b of the rotor 12b are each magnetized to form a quasi pole of a polarity opposite to that of the facing permanent magnet 14a. With this configuration, it is possible to generate magnetic forces 22 between the permanent magnets 14a of the one rotor 12a and the soft magnetic members 15b of the other rotor 12b.

Figure 7:
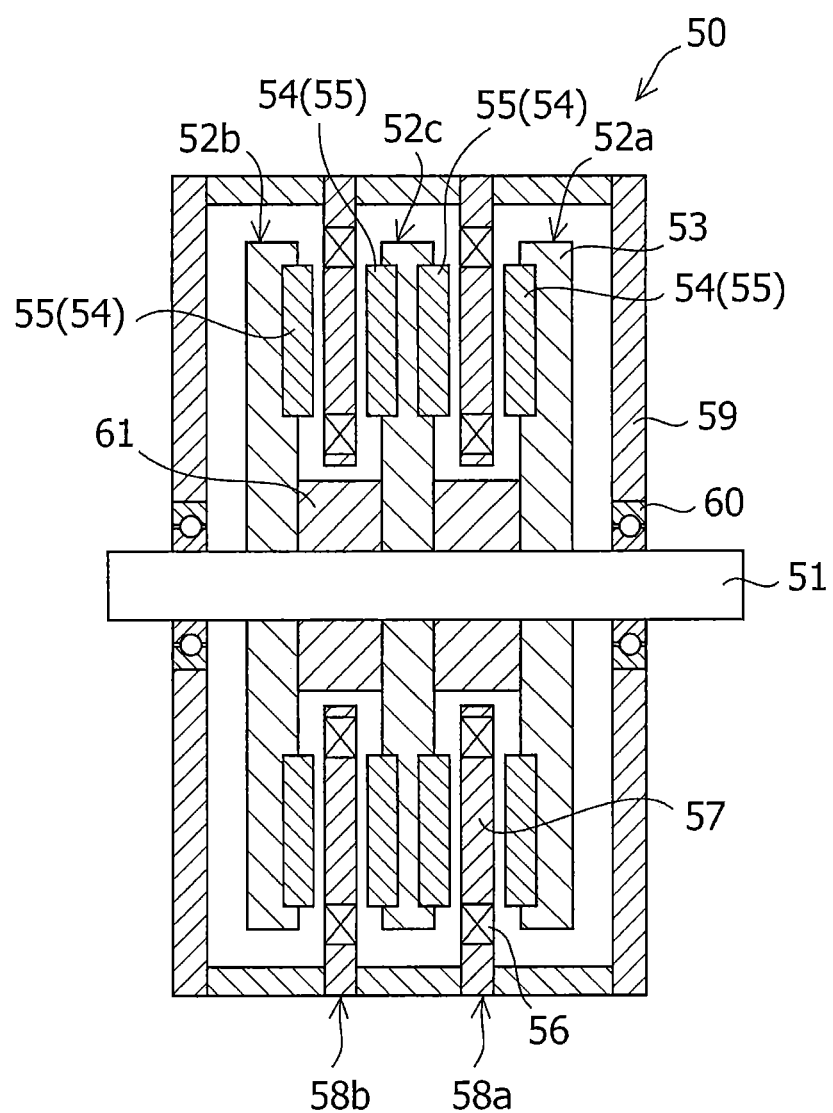
FIG. 7 is a schematic sectional view in another embodiment showing the whole of an axial gap type rotating machine of the present invention.

FIG. 7 shows an embodiment in which the number of rotors is increased in an axial gap type rotating machine in the present invention. A rotating machine 50 shown in FIG. 7 comprises a housing 59 and further comprises, in the housing 59, a rotating shaft 51, three rotors 52a, 52b, and 52c, and two stators 58a and 58b. The rotors 52a, 52b, and 52c each comprises a rotor core 53, and permanent magnets 54 and soft magnetic members 55 arranged on the rotor core 53. The rotors may be disposed with optional spacers 61 interposed therebetween. The stators 58a and 58b each comprises a soft magnetic or nonmagnetic stator core 57 and coils 56 wound on the stator core 57 and is fixed to the housing 59.

The rotating machine 50 differs from that in FIG. 2 in having a structure in which the two stators 58a and 58b are disposed in a gap formed between the surface provided with the permanent magnets 54 and the soft magnetic members 55 of the rotor 52a and that of the rotor 52b, and the rotor 52c having the permanent magnets 54 and the soft magnetic members 55 on both surfaces thereof is disposed between the stators 58a and 58b.

The rotating machine of FIG. 7 is configured such that the stators are respectively disposed in two gaps formed by disposing the two rotors each having the permanent magnets and the soft magnetic members on one surface thereof and the rotor having the permanent magnets and the soft magnetic members on both surfaces thereof in such a way that those surfaces provided with the permanent magnets and the soft magnetic members face each other with a space therebetween. Alternatively, a rotating machine having a sandwich structure may be configured such that, using two or more rotors each having permanent magnets and soft magnetic members on both surfaces thereof, stators are respectively disposed in gaps formed by disposing the rotors in such a way that surfaces provided with the permanent magnets and the soft magnetic members face each other with a space therebetween. In the case where such a rotating machine having a sandwich structure is used as a generator, when a rotating force is transmitted to a rotating shaft from a power source, all rotors rotate synchronously with the rotating shaft so that coils placed at the same position in a direction of the rotating shaft synchronously generate voltages in stators respectively disposed in gaps between the rotors and, therefore, by connecting the coils in series, the electromotive force of the connected coils is proportional to the number of stages of the stators. In this way, it is possible to easily obtain a high power generation voltage by increasing the number of stages of the stators as needed.

EXAMPLES

Hereafter, specific embodiments of the present invention will be described in detail by way of examples. However, it should not be construed that the present invention is limited to those examples.

Example 1

[Configuration of Rotor]

As shown in FIG. 3, a rotor was configured such that eight permanent magnets and eight soft magnetic members were alternately arranged on a rotor core and bonded to the rotor core with an elastic adhesive agent (EP001 manufactured by Cemedine Co., Ltd.). Each of the rotor cores was a disk made of S15C and having an outer diameter of 200 mm and a thickness of 5 mm. A rare-earth magnet having a size of width: 20 mm, length: 35 mm, and thickness in a magnetization direction: 3 mm was used as each of the permanent magnets. Each of the soft magnetic members was made of SS400 and had a size of width: 20 mm, length: 35 mm, and thickness in a magnetization direction: 3 mm.

[Configuration of Rotating Machine]

Using two rotors each produced by the method described above, an axial gap type rotating machine shown in FIG. 1 was fabricated. In the rotating machine, as shown in FIG. 4, the two rotors were faced each other and disposed in such a way that the permanent magnets of one rotor face the permanent magnets of the other rotor, while the soft magnetic members of one rotor face the soft magnetic members of the other rotor. Magnetization was carried out so that the polarity of the poles of the permanent magnets of one rotor differed from the polarity of the poles of the permanent magnets of the other rotor. The width of a gap formed between the two rotors was set to 8 mm and a stator was disposed in the gap. The stator was configured such that 12 coils were placed in a coil-based stator core made of SS400 and having a thickness of 5 mm, each coil having 30 turns.
[Evaluation of Rotating Machine]

For the rotating machine configured as described above, an induced voltage under a condition of 1000 rpm was calculated by an FEM (finite element method) analysis.

Comparative Example

[Configuration of Rotor]

A rotor was configured such that 16 permanent magnets were magnetized and bonded to a rotor core with an elastic adhesive agent (EP001 manufactured by Cemedine Co., Ltd.), wherein S-pole surfaces and N-pole surfaces of the permanent magnets were alternately arranged. Each of the rotor cores was a disk made of S15C and having an outer diameter of 200 mm and a thickness of 5 mm. A rare-earth magnet having a size of width: 20 mm, length: 35 mm, and thickness in a magnetization direction: 3 mm was used as each of the permanent magnets.
[Configuration of Rotating Machine]

Figure 14:
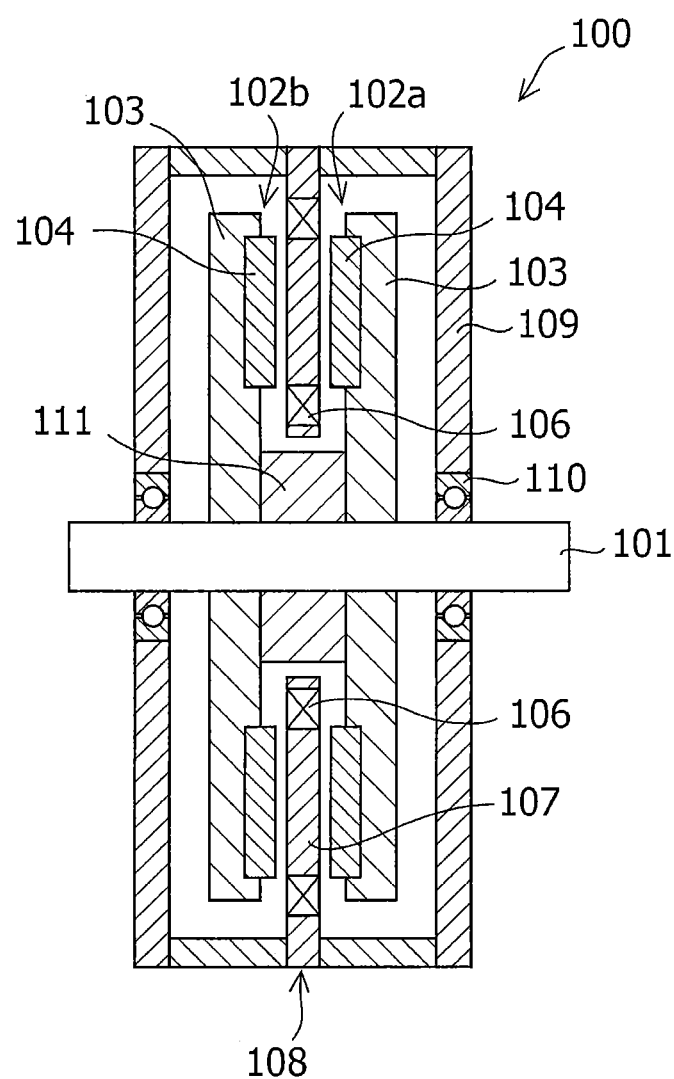
FIG. 14 is a schematic sectional view in an embodiment showing the whole of a conventional axial gap type rotating machine.
Figure 15:
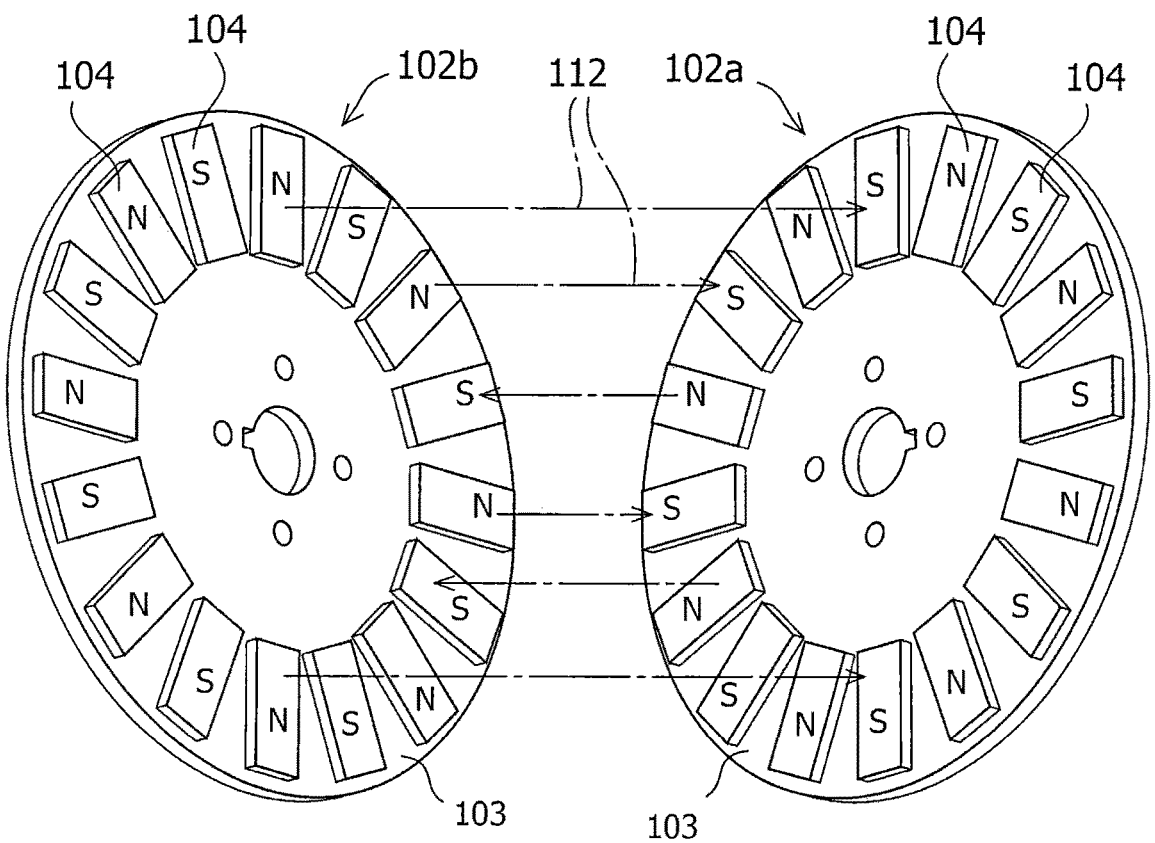
FIG. 15 is a perspective view in which two rotors disposed in the rotating machine of FIG. 14 are developed therebetween on a plane perpendicular to a rotating shaft.

Using two rotors each produced by the method described above, an axial gap type rotating machine shown in FIG. 14 was fabricated. In the rotating machine, as shown in FIG. 15, the two rotors faced each other were disposed so that the permanent magnets of one rotor and the permanent magnets of the other rotor face each other in such a way as to have opposite polarities. The width of a gap formed between the two rotors was set to 8 mm and a stator was disposed in the gap. The stator was configured such that 12 coils were placed in a coil-based stator core made of SS400 and having a thickness of 5 mm, each coil having 30 turns.
[Evaluation of Rotating Machine]

For the rotating machine configured as described above, an induced voltage under a condition of 1000 rpm was calculated by an FEM (finite element method) analysis.

Figure 8:
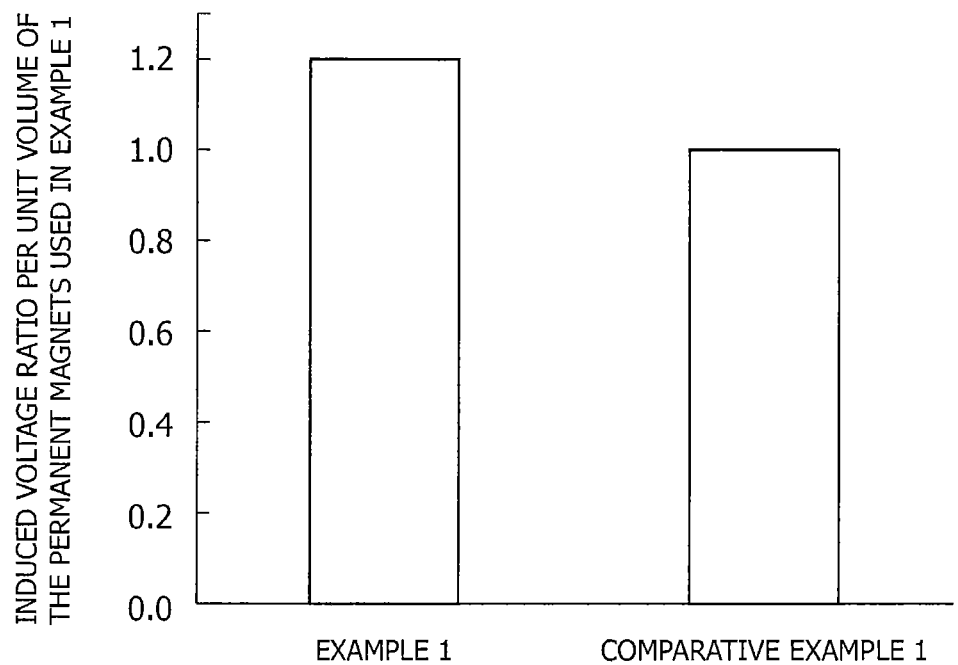
FIG. 8 shows an evaluation result of induced voltage when the arrangement of the two rotors of FIG. 4 and a soft magnetic stator were used in the rotating machine of FIG. 1.

As an evaluation result of Example 1, FIG. 8 shows an induced voltage ratio per unit volume of the permanent magnets used in Example 1 regarding an induced voltage per unit volume of the permanent magnets used in Comparative Example 1 as 1.0. An induced voltage is one of indices indicating superiority or inferiority of the characteristics of a rotating machine and can be calculated by an FEM analysis. In the rotating machine of Example 1 according to the present invention, although the half of the amount of the permanent magnets in Comparative Example 1 was replaced by the soft magnetic members, the induced voltage per unit volume of the permanent magnets was, surprisingly, increased by 1.2 times.

Figure 16:
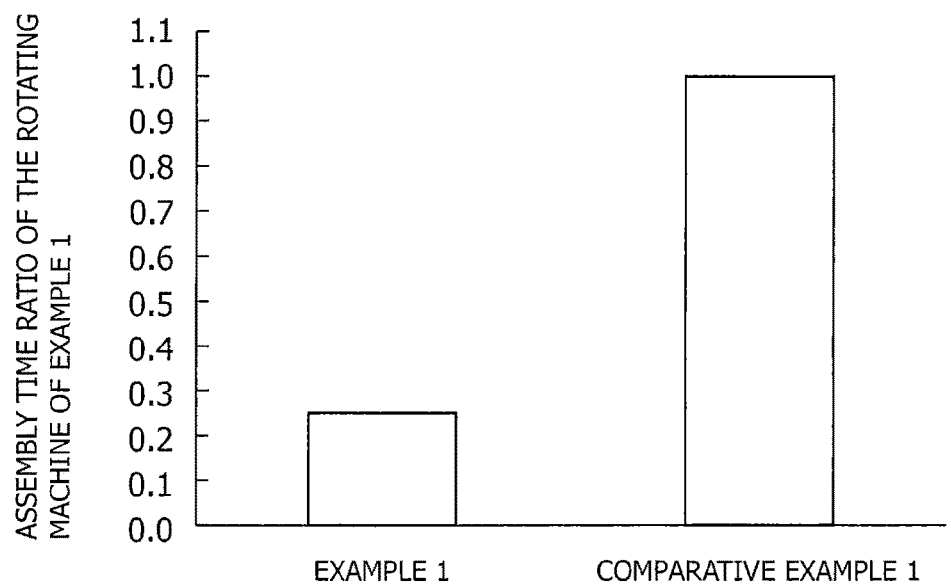
FIG. 16 is a diagram in which the assembly time of a rotating machine of Example 1 is shown regarding the assembly time of a rotating machine of Comparative Example 1 is as 1.0.

FIG. 16 shows a comparison result of an assembly time of the rotating machine of Example 1 regarding an assembly time of the rotating machine of Comparative Example 1 as 1.0. It is evident from the result that the assembly time was shorter in Example 1 than in Comparative Example 1. The assembly time is the sum of a time for bonding such as the bonding of the magnets to the rotor cores and a time for magnetization. Since the premagnetization is used in Comparative Example 1 of the conventional method the magnets are respectively magnetized and then are disposed on the rotor cores in a slipping manner and bonded thereto. On the other hand, in the present invention, since post-magnetization is also possible, after unmagnetized magnets are bonded to the rotor cores, magnetization can be carried out at once per rotor core. When the time for bonding such as the bonding of the magnets to the rotor cores is compared with the time for magnetization, the time for magnetization tends to be longer. This may be attributable to the fact that since magnetization is normally carried out by supplying a pulse current to a magnetization coil from a large-capacity power supply, time is required for charging capacitors used in the power supply. Consequently, according to the present invention, compared to the conventional method, the bonding time and the magnetization time are both short so that the assembly can be efficiently carried out, leading to an improvement in productivity.

Example 2

Example 2 was carried out in the same manner as in Example 1 except that a stator core was made of Bakelite.

Figure 9:
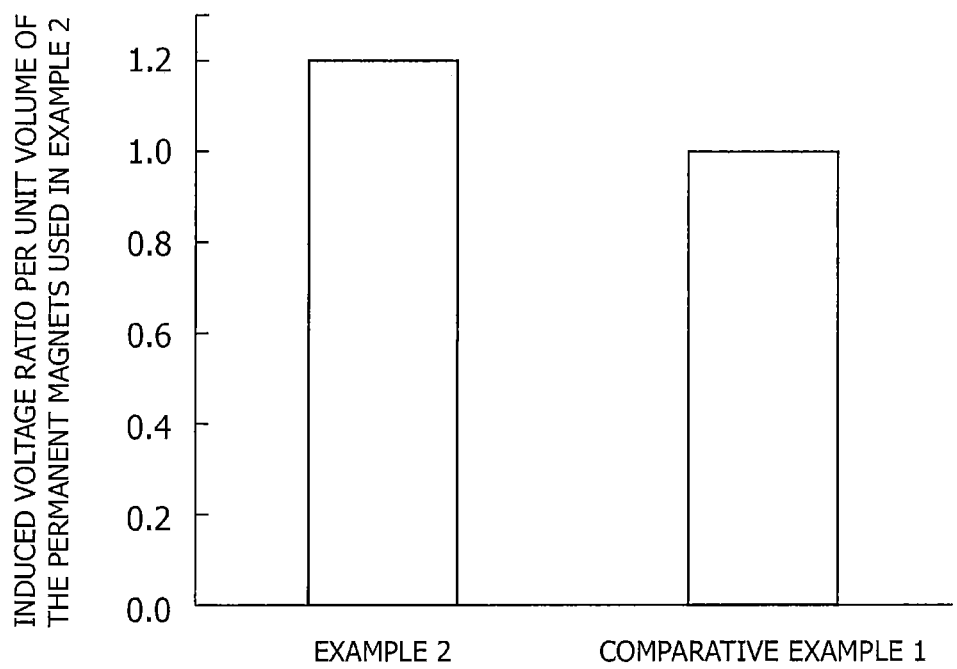
FIG. 9 shows an evaluation result of induced voltage when the arrangement of the two rotors of FIG. 4 and a nonmagnetic stator were used in the rotating machine of FIG. 1.

As an evaluation result of Example 2, FIG. 9 shows an induced voltage ratio per unit volume of the permanent magnets used in Example 2 regarding an induced voltage per unit volume of the permanent magnets used in Comparative Example 1 as 1.0. In the rotating machine of Example 2 according to the present invention, although the half of the amount of the permanent magnets in Comparative Example 1 was replaced by the soft magnetic members, the induced voltage per unit volume of the permanent magnets was surprisingly increased by 1.2 times.

Example 3

Rotating machine fabrication and evaluation were carried out in the same manner as in Example 1 except that an axial gap type rotating machine shown in FIG. 2 was fabricated in such a way that, in the rotating machine, as shown in FIG. 5, two rotors facing each other were disposed so that permanent magnets of one rotor faced soft magnetic members of the other rotor, while soft magnetic members of one rotor faced permanent magnets of the other rotor, and further that magnetization was carried out so that the polarity of the poles of the permanent magnets of one rotor was the same as the polarity of the poles of the permanent magnets of the other rotor.

Figure 10:
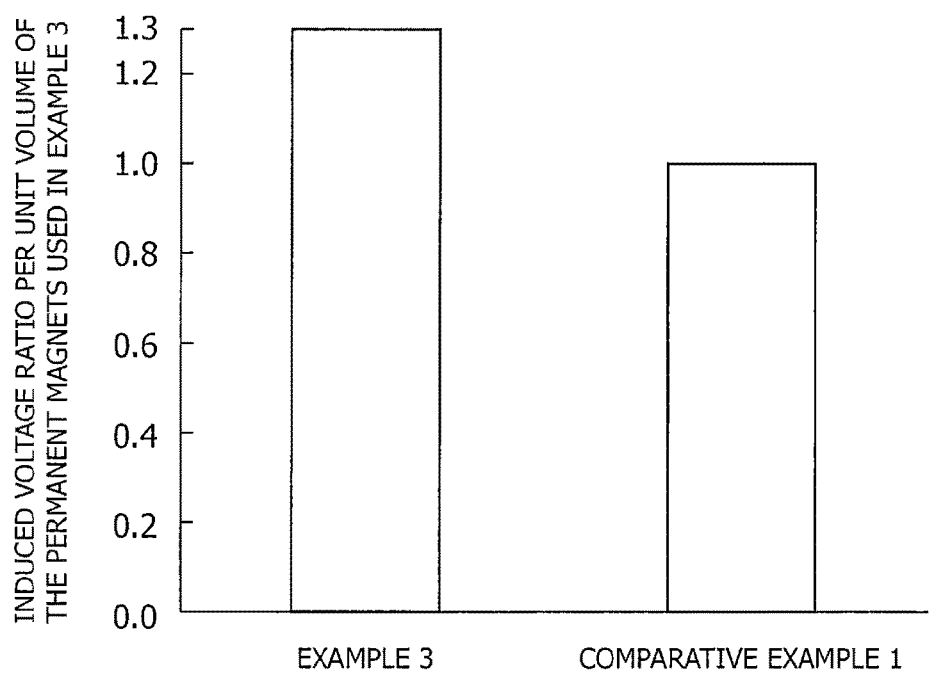
FIG. 10 shows an evaluation result of induced voltage when the arrangement of the two rotors of FIG. 5 and a soft magnetic stator were used in the rotating machine of FIG. 2.

As an evaluation result of Example 3, FIG. 10 shows an induced voltage ratio per unit volume of the permanent magnets used in Example 3 regarding an induced voltage per unit volume of the permanent magnets used in Comparative Example 1 as 1.0. In the rotating machine of Example 3 according to the present invention, although the half of the amount of the permanent magnets in Comparative Example 1 was replaced by the soft magnetic members, the induced voltage per unit volume of the permanent magnets was surprisingly increased by 1.3 times.

Example 4

Example 4 was carried out in the same manner as in Example 3 except that a stator core was made of Bakelite.

Figure 11:
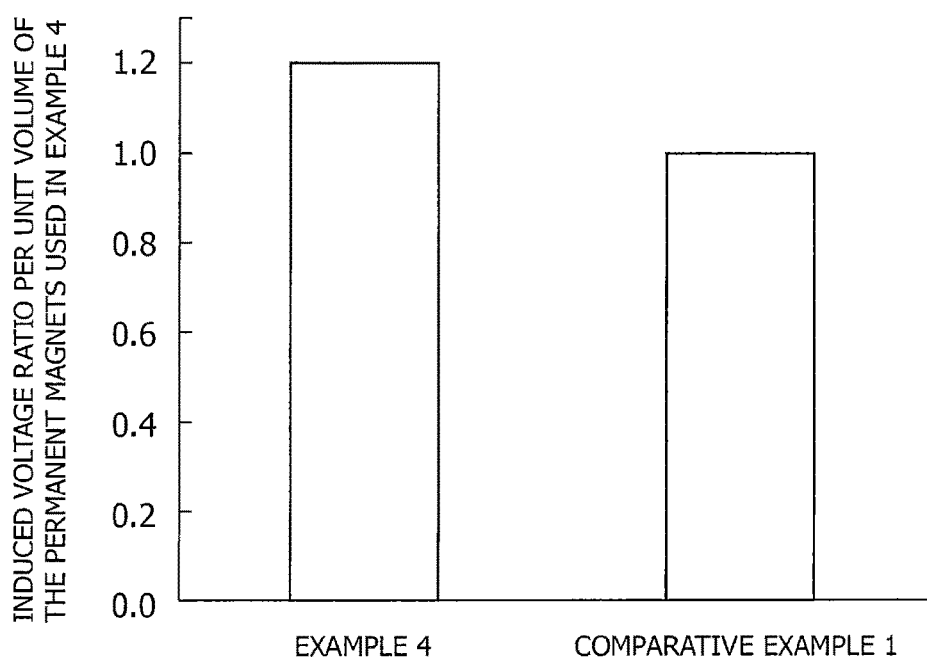
FIG. 11 shows an evaluation result of induced voltage when the arrangement of the two rotors of FIG. 5 and a nonmagnetic stator were used in the rotating machine of FIG. 2.

As an evaluation result of Example 4, FIG. 11 shows an induced voltage ratio per unit volume of the permanent magnets used in Example 4 regarding an induced voltage per unit volume of the permanent magnets used in Comparative Example 1 as 1.0. In the rotating machine of Example 4 according to the present invention, although the half of the amount of the permanent magnets in Comparative Example 1 was replaced by the soft magnetic members, the induced voltage per unit volume of the permanent magnets was surprisingly increased by 1.2 times.

Example 5

[Configuration of Rotor]

Rotors were configured such that 16 permanent magnets were arranged on one surface of the one rotor core, while 16 soft magnetic members were arranged on that of the other rotor core, and that the permanent magnets and the soft magnetic members were bonded to the rotor cores with an elastic adhesive agent (EP001 manufactured by Cemedine Co., Ltd.). Each of the rotor cores was a disk made of S15C and having an outer diameter of 200 mm and a thickness of 5 mm. A rare-earth magnet having a size of width: 20 mm, length: 35 mm, and thickness in a magnetization direction: 3 mm was used as each of the permanent magnets. Each of the soft magnetic members was made of SS400 and having a size of width: 20 mm, length: 35 mm, and thickness in a magnetization direction: 3 mm. After the permanent magnets were magnetized, S-pole surfaces and N-pole surfaces of the permanent magnets were alternately arranged on the rotor core.

[Configuration of Rotating Machine]

Using the two rotors produced by the method described above, an axial gap type rotating machine shown in FIG. 2 was fabricated. In the rotating machine, as shown in FIG. 6, the two rotors facing each other were disposed in such a way that the permanent magnets of one rotor face the soft magnetic members of the other rotor. The width of a gap formed between the two rotors was set to 8 mm and a stator was disposed in the gap. The stator was configured such that 12 coils were placed in a coil-based stator core made of SS400 and having a thickness of 5 mm, each coil having 30 turns.

[Evaluation of Rotating Machine]

For the rotating machine configured as described above, an induced voltage under a condition of 1000 rpm was calculated by an FEM (finite element method) analysis.

Figure 12:
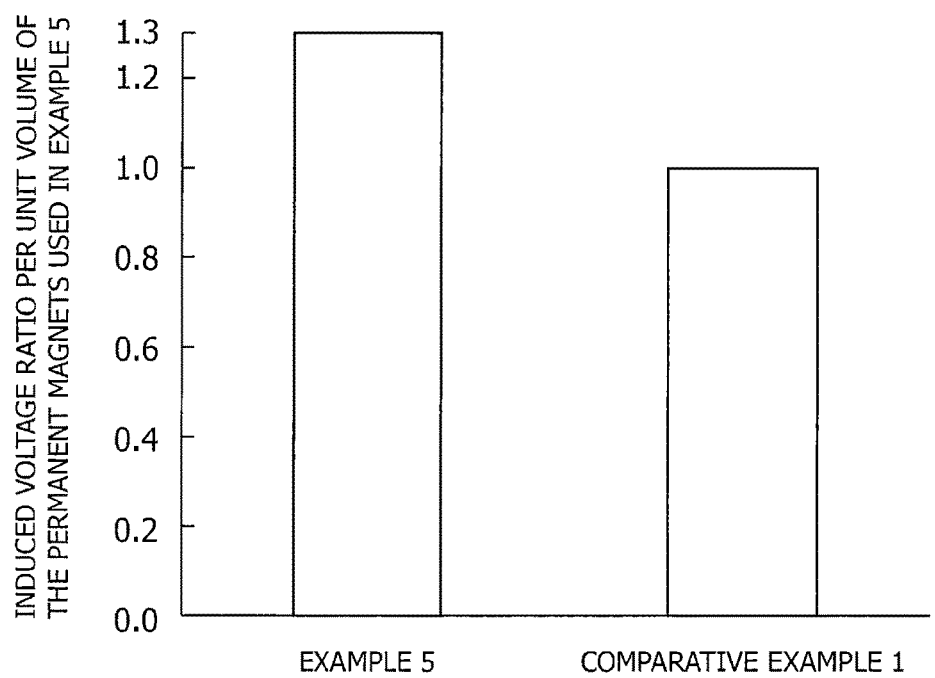
FIG. 12 shows an evaluation result of induced voltage when the arrangement of the two rotors of FIG. 6 and a soft magnetic stator were used in the rotating machine of FIG. 2.

As an evaluation result of Example 5, FIG. 12 shows an induced voltage ratio per unit volume of the permanent magnets used in Example 5 regarding an induced voltage per unit volume of the permanent magnets used in Comparative Example 1 as 1.0. In the rotating machine of Example 5 according to the present invention, the induced voltage per unit volume of the permanent magnets was increased by 1.3 times.

Example 6

Example 6 was carried out in the same manner as in Example 5 except that a stator core was made of Bakelite.

Figure 13:
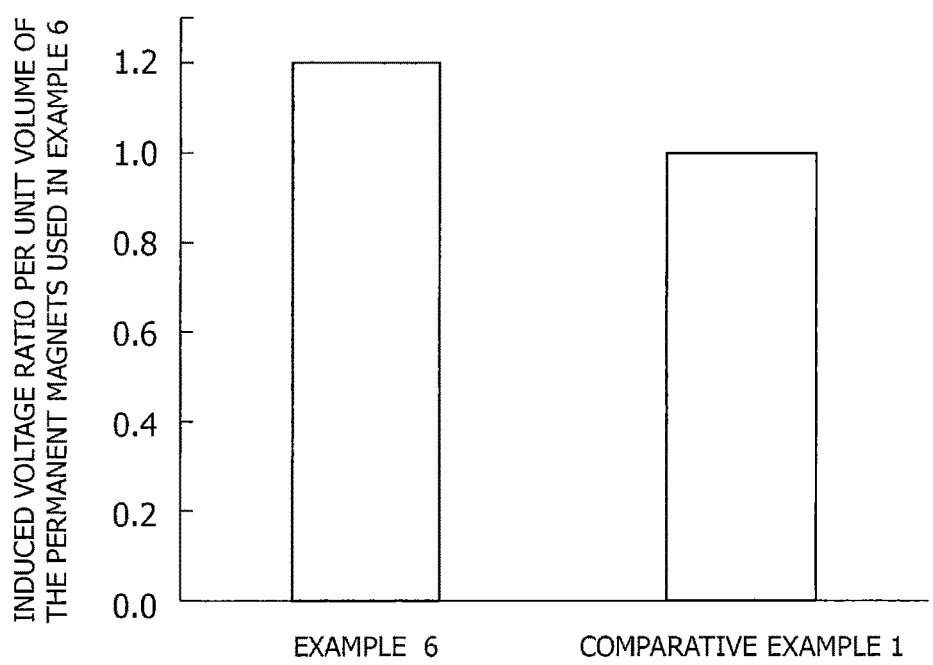
FIG. 13 shows an evaluation result of induced voltage when the arrangement of the two rotors of FIG. 6 and a nonmagnetic stator were used in the rotating machine of FIG. 2.

As an evaluation result of Example 6, FIG. 13 shows an induced voltage ratio per unit volume of the permanent magnets used in Example 6 regarding an induced voltage per unit volume of the permanent magnets used in Comparative Example 1 as 1.0. In the rotating machine of Example 6 according to the present invention, the induced voltage per unit volume of the permanent magnets was increased by 1.2 times.

According to an axial gap type rotating machine of the present invention, it is possible to achieve an improvement in productivity and a reduction in the amount of rare-earth magnets as permanent magnets and thus it is possible to provide a rotating machine suitable for applications such as those of a driving motor of a hybrid vehicle or an electric car, a compressor of an air conditioner, a refrigerator, a freezer, and a showcase.

While the embodiments of the present invention have been described with reference to the drawings, the present invention is not limited thereto and may further include design changes and so on without departing from the scope of the claims.

Having thus described certain embodiments of the present invention, it is to be understood that the invention defined by the appended claims is not to be limited by particular details set forth in the above description as many apparatus variations thereof are possible without departing from the spirit or scope thereof as hereinafter claimed.

The invention claimed is:

1. An axial gap type rotating machine, comprising:
   a housing;
   a rotating shaft in the housing;
   at least two rotors comprising:
      at least two rotor cores rotatable together with the rotating shaft as a central axis and disposed perpendicular to the rotating shaft with an interval along the rotating shaft; and
      at least two permanent magnets and at least two soft magnetic members in which the at least two permanent magnets and the at least two soft magnetic members are alternatingly arranged in a circumferential direction on at least one of facing two surfaces of the at least two rotor cores, all the permanent magnets arranged on each of the surfaces have the same polarity in a direction along the rotating shaft, and only the at least two permanent magnets with the same polarity, or only the at least two soft magnetic members with the same polarity, are arranged on a straight line through a center of the at least one surface and perpendicular to the direction along the rotating shaft; and
   at least one stator comprising:
      a soft magnetic or nonmagnetic stator core; and
      a coil wound on the stator core, an axis of the coil being parallel to the rotating shaft,
      wherein the at least one stator is fixed to the housing and disposed in a gap between the at least two rotors, and
      wherein a magnetic pole from one of the facing two surfaces faces a magnetic pole from the other of the facing two surfaces across the coil of the stator, the two magnetic poles having opposite polarities.

2. The axial gap type rotating machine according to claim 1, wherein:
   the permanent magnets on one of the facing two surfaces of the at least two rotor cores face the permanent magnets on the other of the facing two surfaces, and the soft magnetic members on one of the facing two surfaces face the soft magnetic members on the other of the facing two surfaces; and
   a polarity of the permanent magnets on one of the facing two surfaces differs from a polarity of the permanent magnets on the other of the facing two surfaces.

3. The axial gap type rotating machine according to claim 1, wherein:
   the permanent magnets on one of the facing two surfaces of the at least two rotor cores face the soft magnetic members on the other of the facing two surfaces, and the soft magnetic members on one of the facing two surfaces face the permanent magnets of the other of the facing two surfaces; and
   a polarity of the permanent magnets on one of the facing two surfaces is the same as a polarity of the permanent magnets on the other of the facing two surfaces.

* * * * *